(12) United States Patent
Henriksen

(10) Patent No.: US 10,288,777 B2
(45) Date of Patent: *May 14, 2019

(54) TRANSPARENT OPTICAL DEVICE ELEMENT

(71) Applicant: poLight ASA, Horten (NO)

(72) Inventor: Lars Henriksen, Tønsberg (NO)

(73) Assignee: poLight ASA, Horten (NO)

(*) Notice: Subject to any disclaimer, the term of this patent is extended or adjusted under 35 U.S.C. 154(b) by 132 days.

This patent is subject to a terminal disclaimer.

(21) Appl. No.: 15/294,290

(22) Filed: Oct. 14, 2016

(65) Prior Publication Data

US 2017/0075042 A1 Mar. 16, 2017

Related U.S. Application Data

(62) Division of application No. 14/777,265, filed as application No. PCT/EP2014/055391 on Mar. 18, 2014, now Pat. No. 9,581,737.

(30) Foreign Application Priority Data

Mar. 18, 2013 (EP) ..................................... 13159696

(51) Int. Cl.
*G02B 3/14* (2006.01)
*G02B 1/06* (2006.01)
(Continued)

(52) U.S. Cl.
CPC .......... *G02B 3/14* (2013.01); *B29D 11/00009* (2013.01); *G02B 1/041* (2013.01);
(Continued)

(58) Field of Classification Search
CPC ...... G02B 3/14; G02B 26/004; G02B 26/005; G02B 3/12; G02B 1/041; G02B 1/06; G02B 1/10; G02B 27/28; B29D 11/00009
(Continued)

(56) References Cited

U.S. PATENT DOCUMENTS

| 4,956,432 A | 9/1990 | Vacik et al. |
| 6,450,642 B1 | 9/2002 | Jethmalani et al. |

(Continued)

FOREIGN PATENT DOCUMENTS

| CN | 1 306 918 C | 3/2007 |
| CN | 103087642 A | 5/2013 |

(Continued)

OTHER PUBLICATIONS

Office Action for Japanese Patent Application No. 2013-190688 dated Jan. 8, 2016.
(Continued)

*Primary Examiner* — Evelyn A Lester
(74) *Attorney, Agent, or Firm* — Knobbe Martens Olson & Bear LLP

(57) ABSTRACT

The present invention relates to transparent optical device elements comprising a deformable lens body and to a method for changing the refractive index (RI) of a deformable lens body. The deformable lens body of the invention has an improved mechanical stability, a high refractive index, an optimal degree of stiffness and sheer modulus for use as optical lens.

12 Claims, 7 Drawing Sheets

(51) Int. Cl.
    *G02B 26/00*     (2006.01)
    *G02B 1/04*     (2006.01)
    *G02B 27/28*     (2006.01)
    *G02B 1/10*     (2015.01)
    *B29D 11/00*     (2006.01)
    *G02B 3/12*     (2006.01)

(52) U.S. Cl.
    CPC ............... *G02B 1/06* (2013.01); *G02B 1/10* (2013.01); *G02B 26/004* (2013.01); *G02B 27/28* (2013.01); *G02B 3/12* (2013.01); *G02B 26/005* (2013.01)

(58) Field of Classification Search
    USPC .................................................. 359/665, 666
    See application file for complete search history.

(56) References Cited

U.S. PATENT DOCUMENTS

| | | | |
|---|---|---|---|
| 10,001,629 B2* | 6/2018 | Craen | ............... G02B 13/0075 |
| 2008/0144186 A1 | 6/2008 | Feng et al. | |
| 2011/0038625 A1 | 2/2011 | Zellers et al. | |
| 2011/0149409 A1 | 6/2011 | Haugholt et al. | |
| 2011/0176221 A1 | 7/2011 | Tanaka et al. | |
| 2017/0160442 A1* | 6/2017 | Phair | ........................ G02B 3/14 |

FOREIGN PATENT DOCUMENTS

| | | |
|---|---|---|
| JP | 60-114804 | 6/1985 |
| JP | 2-43208 A | 2/1990 |
| JP | 2004-500585 A | 1/2004 |
| JP | 2007-57716 | 3/2007 |
| JP | 2008-531070 | 8/2008 |
| JP | 2010-97200 A | 4/2010 |
| JP | 2010-518444 A | 5/2010 |
| JP | 2010-128501 | 6/2010 |
| KR | 10-2011-0023630 | 3/2011 |
| NO | 326372 B1 | 11/2008 |
| TW | 201248206 | 12/2012 |
| WO | WO 00/41650 A1 | 7/2000 |
| WO | WO 2005/116697 A1 | 12/2005 |
| WO | WO 2008/035983 A1 | 3/2008 |
| WO | WO 2008/044937 A1 | 4/2008 |
| WO | WO 2008/100154 A1 | 8/2008 |
| WO | WO 2010/005315 A1 | 1/2010 |

OTHER PUBLICATIONS

International Search Report for PCT/EP2014/055391 dated Jun. 13, 2014.

English translation of Taiwanese Search Report in Taiwan Patent Application No. 102133209, filed Sep. 13, 2013, dated Mar. 24, 2017.

* cited by examiner

TRANSPARENT OPTICAL DEVICE ELEMENT

CROSS REFERENCE TO RELATED APPLICATIONS

This application is a divisional application of U.S. patent application Ser. No. 14/777,265, filed on Sep. 15, 2015, which is a U.S. National Phase Application of PCT International Application Number PCT/EP2014/055391, filed on Mar. 18, 2014, designating the United States of America and published in the English language, which is an International Application of and claims the benefit of priority to European Patent Application No. 13159696.7, filed on Mar. 18, 2013. The disclosures of the above-referenced applications are hereby expressly incorporated by reference in their entireties.

FIELD OF THE INVENTION

The present invention relates to transparent optical device elements comprising a deformable lens body.

Furthermore the present invention relates to polymers or pre-polymer mixtures for preparing such a deformable lens body. The present invention does also relate to the use of polymer or pre-polymer mixture for preparing transparent optical device elements, such as adjustable optical lenses.

The present invention does also relate to a method of changing the refractive index (RI) of a deformable lens body and to a method of manufacturing of transparent optical device elements.

BACKGROUND OF THE INVENTION

There is an increasing demand for low cost, high volume solution of miniature lenses in an ever increasing number of applications, such as in mobile phones, laptops, web cameras, etc. The popular use of cameras in mobile phones alone provides a market for millions of lenses. Additionally there is a growing demand in the market with respect to resolution of such miniature cameras and thereby an increasing need for adjustable lenses providing advanced functionalities, such as fast auto focus or zoom. This invention relates to solutions for problems that arise in search for adjustable lenses having advanced functionalities.

US 20110038625 discloses a rather complex adaptive lens comprising at least an actuator and a lens, the lens being mechanically coupled to the actuator so that energization of the actuator adjusts a focal point of the lens. The actuator may comprise a multilayer stack of electromechanical polymer (EMP) layers, having electrodes configured to apply an electric field across each EMP layer. The actuator may be operable to move and/or deform a lens, so as to adjust the focus properties of the lens. In some examples, the actuator has an annular shape, supporting a lens within the inner radius of the annulus. In other examples, the actuator may be mechanically coupled to a surface of a deformable lens, either directly or through another element of a lens structure. This adjustable lens assembly seems to be rather complex in that it comprises several moving parts consisting of different materials. The lens body or lens structure itself is said to be prepared by molding using a mold, where it can be cured. When cured, the lens structure is removed from the mold and an actuator is mounted on one or both sides of the lens structure.

Like in US 20110038625, it is quite common within fabrication of polymer lenses to use replica molding either with thermal or UV curing, where the lens body is prepared in one piece and thereafter removed from the mould for mounting into the desired device, often by use of some sort of fixing agent. This is considered to be an inconvenient and labor-intensive technical method which is considered disadvantageous for fast production of millions of tuneable miniaturized lenses.

Several technical problems are encountered by using a fixing agent or adhesive, such as glue, when one have to introduce a new material into the lens assembly, while maintaining the optical and mechanical quality of the lens assembly. By way of example the fixing agent must have a refractive index matching the refracting index of the lens to avoid optical disturbances. Furthermore the fixing agent must be compatible with the other parts and materials of the lens assembly, both chemically, optically and mechanically. It is also necessary to retain the elasticity and flexibility of the lens body and other parts of the adjustable lens assembly, and accordingly the fixing agent must be just as soft and flexible as the other flexible parts of the assembly. If such requirements are not met, tensions will rise between the different parts of a lens assembly, e.g. between a fixing agent, a glass surface, an actuator and/or a lens body, i.e. between all parts having an undesired stiffness.

Still another problem faced by using a fixing agent is the thermal expansion of a further component as the fixing agent will typically have a different coefficient of thermal expansion than the other components of the lens assembly when exposed to different temperatures giving rise to tensions in the lens assembly. It is well known that that especially hybrid materials, built up of materials with large differences in thermal expansion, such as glass, silicon, polymers and metal, will face problems both during operation and during manufacturing (wherein high temperatures are final device) due to large differences in the thermal expansion of the different materials. Accordingly, introduction of even further elements will increase the problem. In this respect it can be mentioned that WO 2010/005315 discloses a method and arrangement for reducing thermal effects in compact adjustable optical lenses.

If a further component, such as a fixing agent, is to be introduced, this will also require further process steps making the process even more complex and probably slower. Additionally, the hardening and curing time must be controlled to obtain a successful lens assembly having the desired optical and mechanical properties.

Accordingly, there is a need FOR a lens assembly process wherein the use of fixing agent(s) is/are avoided.

Different other types of improved adjustable lenses have been developed and described for example in the following patent applications: NO20064271, WO 2010/005315, WO 2008/100154 and WO 2008/044937.

The compact adjustable lens according to WO 2010/005315 is considered to be an especially interesting lens. This adjustable optical lens comprises a deformable lens body confined in a cavity bounded by a flexible glass surface supported by rigid sidewalls and an attached transparent bottom plate. Furthermore, there is an opening between the sidewalls and the edges of the transparent bottom plate and a corresponding opening around the lens body and the sidewalls. Additionally actuators are arranged on the flexible glass surface to deform the lens body, thereby enabling adjustments of focal length.

The above mentioned lens design requires a flexible polymer that is partially surrounded by air (no physical contact with the sidewalls of the cavity). A further problem faced when manufacturing such a lens is how to shape the deformable polymer in such a (flat) cylindrical shape.

There are many issues to be solved associated with adjustable optical lenses and their manufacturing wherein a soft polymer is deformed by an actuator layer structure that is located adjacent to a surface of the soft polymer constituting the lens body. Especially, the manufactured lens must satisfy certain strict requirements with respect to optical and mechanical properties. First of all the lens body must be uniform in all directions, i.e. isotropic, as any kind of anisotropy with respect to optical properties will result in a lens with different optical properties in different directions of the lens body. Thus, an isotropic lens body will have homogeneous optical properties, such as refraction and transmittance, throughout the whole lens body. Anisotropy, such as birefringence, is highly undesirable, as it leads to poor optical quality in a captured image. Thus, the absence of structural defects in the lens body is appreciated. Furthermore the lens body must be clear and highly transparent, allowing light to be transmitted through the lens. All kinds of impurities, including air bubbles, having a different refractive index compared to the lens material, must be avoided.

It is also important that the optical and mechanical properties remain relatively stable at the temperatures the device, e.g. a camera, will be exposed to during operation. If changes occur over a temperature range, it is important that there are no abrupt, irreversible or unpredictable changes. Thus, not only must the lens including the polymer body withstand high temperatures during manufacturing but it must also function at much lower temperatures as the lens may be operated at temperatures ranging from −25 to 80° C., or wider.

Further problems to be solved are the difficulties related to mass production of such adjustable lens assemblies such as the speed of the process. In order to enable the mass production of millions of lenses per year, at prices low enough to be available for relatively low cost electronic products, quite strict limitations are put on the manufacturing processes.

Hence, a transparent optical device element comprising a deformable lens body having an improved mechanical stability would be advantageous, and in particular a deformable lens body having a high refractive index, an optimal degree of stiffness and sheer modulus would be advantageous.

OBJECT OF THE INVENTION

It is an object of the present invention to identify a transparent optical device element comprising a deformable polymer material having the desired combination of optical and mechanical properties as described above for use in adjustable lens assemblies.

A further object of the present invention is to avoid the use of undesired components such as fixing agents by providing a lens body which in itself has adhesive properties making the use of any kind of fixing agents unnecessary.

Still another object of the invention is to provide a process for manufacturing adjustable optical lens assemblies.

It is an object of the present invention to provide a method for changing the refractive index of a deformable lens body.

In particular, it may be seen as an object of the present invention to provide a deformable lens body having an improved mechanical stability, a high refractive index, an optimal degree of stiffness and shear modulus for use as optical lens that solves the above mentioned problems of the prior art.

It is a further object of the present invention to provide an alternative to the prior art.

SUMMARY OF THE INVENTION

The above described objects and several other objects are intended to be obtained in a first aspect of the invention by providing a transparent optical device element comprising: at least one deformable lens body; a bendable transparent cover member attached to a surface of the at least one deformable lens body thereby providing mechanical stability to the at least one deformable lens body;

actuators for shaping the bendable transparent cover member into a desired shape, the actuators located on a top surface of the bendable transparent cover member, the desired shape defined by a disposition pattern of the actuators and by a magnitude of respective applied voltages onto the disposition pattern of actuators, wherein the at least one deformable lens body has (a) an elastic modulus larger than 300 Pa, thereby avoiding deformation due to gravitational forces in normal operation of the transparent optical device element;

(b) the refractive index is above 1.35;

(c) the absorbance in the visible range is less than 10% per millimeter thickness of the deformable lens body; and the deformable lens body comprises a polymer network of cross-linked or partly cross-linked polymers; and further comprises a miscible oil or combination of oils, thereby increasing the refractive index of the polymer network of crosslinked or partly cross-linked polymers.

The invention is particularly, but not exclusively, advantageous for obtaining a transparent optical device element having the desired mechanical stability. In order to be used as lens body the polymer network of cross-linked or partly crosslinked polymers has to have a certain degree of mechanical stability. Generally mechanical stability is provided within the chemical structure of the polymer network by introducing polymers or pre-polymers having a desired chemical composition and thus the chemical structure, once cured, provides a desired degree of mechanical stability. Thus generally, the polymer structure in itself provides the desired mechanical stability to the lens body. The solution of the invention, on the contrary, stems from the use of a polymer network of crosslinked or partly cross-linked polymers that do not have a specific mechanical stability but where the desired mechanical stability of the transparent optical element is provided through the presence of a bendable transparent cover member.

Thus, the solution of the invention is to combine a deformable lens body and a bendable transparent cover member, the combination of which provides the desired mechanical stability.

The actuators have the function of shaping the bendable transparent cover member into a desired shape. The bendable transparent cover member is bent into the desired shape due to the pattern and disposition of the actuators located on a top surface of said bendable transparent cover member and by the magnitude of respective applied voltages. The shaping of the bendable transparent cover member indirectly changes the shape of the attached deformable lens body.

The invention relates to a transparent optical device element where the response to the actuator is optimized so as to provide a fast response upon minimum stimulus, such as a minimum applied voltage and power consumption.

When taking photos with a modern digital camera, the autofocus system will normally operate by a repetitive loop of changing the focus point and analysing the image sharpness, until the desired area of a picture is in focus. It is also a growing trend to provide image manipulation functions based on a series of images being for example interpolated into one picture.

The relevant time scale in this process is the so called frame rate of the camera, i.e. the number of pictures acquired per second. In order to have as fast as possible autofocus (or image manipulation), it is crucial that the time to change the focal point is substantially shorter than the duration of one single frame. For modern cameras, a frame rate of 25 to 100 frames per second might be achieved. Thus, response time for the actuator of less than 10 milliseconds is preferred, even a response time lower than 1 millisecond is beneficial. To be able to change focus frequently and fast, low power consumption may be required in order to not wear out the battery too fast. An actuator that dissipates less than 1 mW is considered to be a low power actuator having a minimum power consumption. The bendable transparent cover member may be made out of a transparent material providing a mechanical and structural reinforcement of the deformable lens body attached to the bendable transparent cover member.

The bendable transparent cover member may be made from a transparent material selected from the group of glasses, inorganic oxides and rigid polymeric materials such as carbonates, acrylates, and epoxies.

In some embodiments the bendable transparent cover member is made of glass and has a thickness in the range of 10 to 50 μm.

With respect to mechanical properties such as the mechanical stability, the lens body must have a desired stiffness/softness for the lens to easily shift its focus. Stiffness is the rigidity of an object the extent to which it resists deformation in response to an applied force. In elastic or viscoelastic material hardness in the elastic range is known as stiffness. Hardness is a measure of how resistant solid matter is to various kinds of permanent shape change when a force is applied. Hardness is associated with parameters such as ductility, elastic stiffness, plasticity, strain, strength, toughness, viscoelasticity, and viscosity.

If the lens body is too stiff, the degree of bending of the transparent cover member that is provided by the actuator will be reduced. A certain reduction can be acceptable. It is however highly desirable to minimize the reduction in actuator movement as much as possible. Making use of the maximum potential bending strength of the actuator minimizes the force needed to obtain a given change in optical power. This will be highly beneficial for both cost and environmental impact during production of the device and reducing the power consumption in an autofocus camera. In order to quantify the extent of reduction in actuation strength, one can say that more than 25% loss is unacceptable from a practical point of view.

If only minimizing the reduction of actuation strength was of importance, it would be highly advantageous to choose a deformable lens body that had virtually no stiffness at all. Liquids would be the natural choice, and there exists prior art where the lens body is a liquid. However, using liquids in small optical devices has some great disadvantages, both with respect to the lifetime and usability of the device and due to the fact that liquids must be contained in sealed cavities, and the production processes can be tedious. The solution of the invention is the use of a deformable lens body that is of solid matter. A solid matter means in this context that it has a non-zero plastic or elastic modulus, meaning that it will resist deformation when exposed to a given stress. Having a low or even zero plastic deformation, and for the relevant degrees of deformation an elastic behaviour is desirable.

Polymeric materials are commonly viscoelastic, that is, they inhibit both elastic and viscous behaviour when exposed to stress. Viscous materials resist shear flow and strain linearly with time when a stress is applied. Elastic materials strain instantaneously when stretched and just as quickly return to their original state once the stress is removed. Viscoelastic materials have elements of both of these properties and, as such, exhibit time-dependent strain.

In order to have elastic and virtually no plastic deformation, the invention uses elastomeric materials, made up of a physically or chemically cross linked three dimensional network of polymer molecules that are exhibiting high degree of mobility under deformation. Elastomers typically have a glass transition temperature well below the intended operating temperature range, giving the required softness or elasticity, while the cross-links cause the material to regain its shape after a deformation.

Viscoelasticity may be studied by using dynamic mechanical analysis, for example applying a small oscillatory stress and measuring the resulting strain.

Purely elastic materials have stress and strain in phase, so that the response of one caused by the other is immediate.

In purely viscous materials, strain lags stress by a 90 degree phase lag. Viscoelastic materials exhibit behaviour somewhere in the middle of these two types of material, exhibiting some lag in strain.

Complex Dynamic modulus is the ratio of stress to strain under vibratory conditions e.g. calculated from data obtained from either free or forced vibration tests, in shear, i.e. shear modulus G and can be used to represent the relations between the oscillating stress and strain:

$$G=G'+iG''$$

Where $i^2=-1$, G' is the storage modulus that is dependent on the elastic modulus, such as the Young's modulus, while G" is the loss modulus that is more heavily dependent on the viscosity variable η.

Viscosity η is a measure of the resistance of a fluid which is being deformed by either shear stress or tensile stress.

Young's modulus, also known as the tensile modulus or called the elastic modulus, being the most common elastic modulus, is a measure of the stiffness of an elastic material. It is defined as the ratio of the uniaxial stress over the uniaxial strain in the range of stress. In solid mechanics, the slope of the stress-strain curve at any point is called the tangent modulus. The tangent modulus of the initial, linear portion of a stress-strain curve is called Young's modulus (E). It can be experimentally determined from the slope of a stress-strain curve created during tensile tests conducted on a sample of the material.

As the deformable lens body must be adjustable for changing focus of the lens, it must have the ability to return from a deformed state (temporary shape) induced by an external stimulus (trigger) to its original (permanent) shape. Thus, the deformable lens body must not be permanently deformed when under stress or strain.

For polymer materials, the shear modulus G is often used as a relevant measure. The shear modulus is the mathematical description of an object or substance's tendency to be deformed when a shear force is applied to it and is defined as the ratio of shear stress to the shear strain.

Thus, the stiffness/softness of the lens body may be defined by G.

For homogeneous, isotropic materials, the relationship between Young's (elastic) modulus (E), shear modulus (G) and the Poisson's ratio (ν) is:

$$E = 2G(1+\nu)$$

For elastomeric polymers, ν is normally close to 0.5, which gives the simple relationship:

$$E = 3G.$$

For applications of polymers as the deformable lens body in an adjustable lens assembly, it has been found that it is a requirement to have a shear modulus which is lower than 100 kPa. It is even more desirable to have a shear modulus lower than 50 kPa, or even as low as 10 kPa.

For applications of the deformable lens body in an adjustable autofocus camera lens, there will be a minimum required stiffness or modulus. The device must withstand significant deformation due to gravity and gravitational forces that might occur during the working life of the autofocus camera. The inventors have observed that a shear modulus of larger than 100 Pa is required.

Thus, the elastic modulus should be above a desired minimum value of 300 Pa, thereby avoiding deformation due to gravitational forces in normal operation of the transparent optical device element. According to the relation above the preferred range of shear modulus between 100 Pa and 100 KPa gives a preferred range of the elastic modulus between 300 Pa and 300 KPa.

In simple words, one might say that if the polymer is too soft the construction will collapse in normal operation and if it is too stiff the lens will not be adjustable.

In search for reducing the hardness or stiffness of a polymer network the general solution may be to introduce variations in the polymer chain so as to obtain polymers network with reduced shear modulus. However, since the adjustable lens is a part of an autofocus system, where focus speed is an important parameter, the time dependent viscoelastic properties becomes important. The approach of reducing the stiffness or modulus of a polymer system by making a looser network in the polymer it is often experienced that a reduction in the storage modulus is accompanied by a higher loss modulus, that is the polymer might exhibit a very slow response to rapidly induced shear forces, which in turn yields a slow responding adjustable lens.

Thus, in some embodiments the at least one deformable lens body has a shear modulus of less than 100 KPa.

A shear modulus (measured at 1-100 Hz in an oscillating parallel plate rheometer) of below 100 kPa can be achieved in several ways:

by introducing a large amount of dangling ends in the network by:
a. using a graft copolymer with high amount of monofunctional pre-polymers or monomers;
b. using long chain branched pre-polymers;
c. using a non-stoichiometric ratio between reactive groups;

The former of these solutions has the disadvantage of making elastomeric materials that exhibit low storage modulus, but a relatively high loss modulus, thus giving a viscoelastic material with a rather slow behavior when exposed to rapidly changing stress.

The solution of the invention decreases the shear modulus by adding oils to the polymer network. Such oils are often also called plasticizers. The solution of the invention differs from others as a shear modulus lower than 100 Kpa is achieved by introducing a low molecular weight oil or swelling agent (Mw<10 000) that is miscible with and not covalently bound in the network (0 to 90 weight % is in principle feasible). In this way the storage modulus is reduced while the loss modulus is not substantially increased thus leading to polymer network including oil or combination of oils having the desired degree of softness to be used as lens body, while at the same time retaining a quick response to rapidly changing stresses.

The desired value of shear modulus allows for use of the invention as a lens body, such as a lens body for a camera, having a quick reaction time upon application of rapidly imposed small forces.

Through the invention this effect is achieved by introducing oil or a combination of oils into a polymer network, so as to achieve the desired value of shear modulus, thus providing a lens body with very fast response to application of very small force.

The solution of the invention thus leads to a polymer network including oils having both a low shear modulus in general, or a low dynamic storage modulus, but at the same time having an even lower loss modulus so as to have a fast response to a rapidly changing external stimuli or stress. However, the low modulus may create a problem in using the polymer network as a lens body as such. In general a lens body needs to have degree of hardness or stiffness so as to be able to mechanically withstand the use as a lens. The lens must withstand forces applied both during the production or assembly process, when integrating the lens in a camera, and during normal operation of the device. Also, scratching of the lens surfaces, adhesion of dust particles, and similar might seriously impact the quality of a photograph taken with a camera including such a lens. A high degree of mechanical stability is thus required. However, by reducing the modulus of the lens body by introducing oil or combination of oils in the polymer network, the material may become too soft so that its structure cannot mechanical withstand the use as a lens. In other words in search for maximizing the speed of response to external stimuli, a polymer material that is not suitable as such to act as a lens body may be produced.

The solution of the invention is thus to provide an optical device element that further comprises a bendable transparent cover member attached to a surface of at least one deformable lens body. The bendable transparent cover member will give mechanical rigidity and stability towards damage both due to deformations, impact, handling, scratching and dust particles.

The solution of the invention solves also the problem of how to use a polymer network lacking of mechanical properties needed to be used as a lens body, by providing the necessary mechanical stability of the polymer through the use of a bendable transparent cover member, such as a plate, such as a glass or a polymer plate, which is attached to a surface of the deformable lens body. In this way the mechanical stability of the lens body is not provided by the lens body in itself but by the bendable transparent cover member in contact with the lens body.

The invention thus provides a lens body having an optimal response to the application of forces changing its shape due to its composition. This composition would not be able to be used as a lens body due to its low modulus as it does not fulfill the requirements of mechanical stability for a lens. However this problem has been solved by providing a support for the lens body through a bendable transparent cover member that provide the mechanical stability to the lens body that is located on its surface.

The invention thus provides, according to one embodiment a lens body that should be clear and highly transparent, be isotropic, be very soft with a shear modulus (G) of less than 100 kPa, be thermally stable and have satisfactory long term stability and ageing resistance. These are the characteristics of the final polymer of the lens body.

In a second aspect the present invention relates to the use of a pre-polymer mixture of the invention for preparing adjustable optical components which comprise a transparent, thermally stable, soft and deformable polymer having a shear modulus of less than 100 kPa. Yet a third aspect of the present invention relates to the use of the pre-polymer mixture of the present invention for preparing adjustable optical lenses of sandwich structure which comprise a transparent, thermally stable, soft and deformable lens body having a shear modulus of less than 100 kPa.

In a forth aspect of the present invention relates to an adjustable optical lens of sandwich structure, prepared in accordance with the present invention, comprising a soft and deformable lens body confined on a transparent bend able cover comprising actuators on a thin glass surface supported by sidewalls (actuator chip), wherein a second surface constituting a bottom side of the cavity is arranged as an attached transparent plate onto the lens body such that there is an opening between the side walls and the edges of the transparent plate, wherein the deformable lens body has an shear modulus equal to or less than 100 kPa.

Since a lens by definition is refracting the light, thereby changing for example the focal point of light passing through it, having a controlled refractive index is crucial. In order to make a more efficient refraction of light, both with respect to the physical dimensions of the lens and for adjustable lenses, to have a large change in refraction at various positions of the lens, it is often highly advantageous to have a high refractive index. It is advantageous to have a high refractive index of the flexible lens body, since higher change in refraction is achieved with a given actuation.

However polymers having a high refractive index may not have the mechanical properties required for being employed in a lens.

In some embodiments the refractive index ratio between the transparent polymer network of cross-linked or partly cross-linked polymers and the oil or combination of oils is between 0.8 and 1.

In some further embodiments the difference in refractive index ratio between the transparent polymer network of cross-linked or partly cross-linked polymers and the oil or combination of oils is between 0.01 and 0.30.

In some even further embodiments the oil or combination of oils has a refractive index which is at least 0.02 units higher than the refractive index of the transparent polymer network of cross-linked or partly cross-linked polymers.

Transparent is herein defined as having a high transmittance, or consequently a low absorbance, such as lower than 10% per mm in the visible range of the electromagnetic spectrum. The visible range may include near infrared (N.I.R.) and at least part of the UV spectrum.

The invention is particularly, but not exclusively, advantageous for obtaining a transparent optical device element having a high refractive index, RI.

The refractive index is the measure for the speed of light in a material, relative to the speed of light in vacuum—a refractive index of 1.5 is for example equivalent to saying that the speed of light in that material is 50% less than in vacuum. The refractive index is an important physical parameter with practical use, especially in optics, where effects such as refraction and reflection both depend on the refractive index of materials and the interfaces of such materials. The refractive index is theoretically linked to the dielectric properties of the material. The dielectric properties are also very much correlated with the polarity of a chemical compound and also the miscibility of materials.

Generally the refractive index of a lens body is limited by the RI of the polymer used to produce the lens body, thus polymer with high RI are desired. However these polymers generally do not have the desired properties so as to comply with the requirement for lens body to be used as adjustable optical lens. The solution of the invention is to increase the RI of a lens body, such as a polymer lens or a polymer composition for a lens, by adding oil or a combination of oils, thereby increasing the refractive index of said polymer according to the equation:

$$n = x_{polymer\ network} n_{polymer\ network} + x_{oil} n_{oil} \quad (1)$$

wherein x is the weight fraction and n is the refractive index.

Introducing an oil or combination of oils into a polymer network of cross-linked or partially cross linked polymers has also the great advantage of enhancing the refractive index of the polymer network used.

Preferably, the lens body should have a refractive index being as high as possible, e.g. in the range of 1.35-1.90. Accordingly, the refractive index of the lens body should be at least 1.35, e.g. in the range between 1.35-1.75, such as in the range between 1.35 and 1.55.

Quite surprisingly it was discovered that it is possible to include oils that differ quite much in refractive index. It is not trivial to create homogeneous, transparent blends of two components that differ in refractive index, especially when one or both of the components are polymeric materials. In some examples as plasticizer or oil for incorporation in a swollen polymeric network, a non-functional polymer or oil that is as similar as possible to the functional components that will make up the three dimensional network was selected. In some examples adequate functional polymers and non-functional polymeric or oligomeric oils were selected and the refractive index of a swollen cross-linked polymer was increased by as much as 0.05 units, which for the application of the material in a prism or lens, is equivalent to an increase in refraction by as much as 15%.

In some embodiments the oil or combination of oils has a molecular weight lower than 1000 g/mol.

The use of specific polymers having a molecular weight lower than 1000 g/mol has the advantage of allowing addition of miscible oil or combination of oils having a difference in refractive index in comparison to the one of the specific polymer that is higher than the polymer having a molecular weight higher than 1000 g/mol. Thus the solution of the invention allows for a higher increase in the refractive index of the lens body following a linear addition rule.

The polymer network of cross-linked or partly cross-linked polymers and the oil or combination of oils may be in the same liquid phase.

In some embodiments the oil or the combination of oils has a very high degree of miscibility with the polymer. The invention thus provides a combination of miscible oils and polymers so as to achieve the desired RI.

Miscibility is the property of liquids to mix in different proportions, forming a homogeneous solution.

Thus a miscible oil is defined as an oil that can be mixed with a polymer leading to a system of an oil and a polymer that is homogeneous and stable at a given mixing ratio over a wide temperature range. Full miscibility might occur at mix ratios from 0 to 100%, or there can be a miscibility window for binary or ternary systems, outside of which phase separation occurs. In this context, a miscible oil, or mixture of oils, is defined as an oil that creates a homogeneous solution with the polymer and cross-linked polymer within a given miscibility window that ranges from 0.1-10% to 0.1-90%. Preferably the mix ration is from 20 to 80% vol/vol, Creating miscible systems by mixing polymers or incorporating oils/solvents/plasticizers into a polymeric three dimensional network, is not trivial. Even when several theoretical aspects of thermodynamics of polymer blends are considered prediction on miscibility may be done with poor success based on compounds dipole moments, surface tensions, solubility parameters and other parameters.

In some embodiments the oil or combination of oils is contained in the transparent polymer network of cross-linked or partly cross-linked polymers. Contained is herein defined as included in the polymer network, for example the polymer and the oil or combination of oils may be in the form of a gel.

In some embodiments the amount of the oil or combination of oils is in a range between 0.1 and 90% vol/vol, such as in the range between 10 and 80% vol/vol, e.g. in the range between 20 and 70% vol/vol, of said transparent polymer network of cross-linked or partly cross-linked polymers.

In some embodiments the amount of the oil or combination of oils constitutes about 80% by volume of the deformable lens body.

In some further embodiments the oil or combination of oils has a boiling point above 200° C. at atmospheric pressure at sea level.

Operating temperatures for camera devices containing an adjustable lens with the deformable lens body can be as wide as −40° C. to 100° C. In order to withstand especially the higher temperature ranges for prolonged times, the stability of the deformable lens body must be excellent at these temperatures. Neither the transparency nor the stiffness, nor the total weight of the lens body should change by more than 5% after exposure to 100° C. for a period of 1000 hours.

When low molecular weight oils, such as lower than 1000 gr/mol constitute a significant part of such lens bodies, such oils must have a high boiling point and a low vapour pressure at the relevant temperatures.

Polymers

In some embodiments the polymer network of cross-linked or partly cross-linked polymers is a polymer network of cross-linked or partly cross-linked polysiloxanes.

From the enormous number of polymers certain polysiloxanes have shown to be useful for soft deformable lens bodies and their manufacturing. Polysiloxanes, frequently referred to as silicones, are partially organic compounds, but, unlike most polymers, they have a backbone containing no carbon, instead they are composed of alternating silicon and oxygen atoms. In most polysiloxanes, two organic groups, often methyl or phenyl, are attached to each silicon atom. Polysiloxanes in general are exceptionally stable and inert. Due to availability and also the rather well-defined structure, vinyl-terminated siloxanes are commonly used when preparing elastomeric silicone networks. By "vinyl terminated", it is generally meant that there is one vinyl group on each of the ends of a linear polymeric molecule. These are available from different producers, with molecular weights ranging from 200 to more than 200 000. The DMS-V00 to DMS-V52 series from Gelest Inc. indicates the span of easily available vinyl-terminated polydimethylsiloxanes. Phenyl containing analogues are also available from Gelest Inc. (the PDV and PMV series), and also copolymers of dimethyl and diethyl siloxanes exist (EDV-2025). In addition to the vinyl-terminated polysiloxanes, there exists poly co-(vinylmethyl dimethyl) siloxanes, polyvinylmethylsiloxanes, long chain branched vinyl-functional polysiloxanes and silsesquioxanes with multiple vinyl-terminal groups.

For the present invention vinyl-containing polysiloxanes containing two or more vinyl groups per molecule are preferred. More preferably vinyl-containing polysiloxanes containing between 2 and 5 vinyl groups per molecule can be used. Such vinyl-containing polysiloxanes can preferably be chosen from the group of polydimethyl siloxanes, poly (methyl phenyl) siloxanes, poly co-(dimethyl diphenyl) siloxanes, poly ter-(dimethyl diphenyl methylphenyl) siloxanes, containing between 2-5 vinyl groups per molecule.

By way of example, the chemical formula for polydimenthylsiloxane (PDMS) is $CH_3[Si(CH_3)_2O]_nSi(CH_3)_3$, where n is the number of repeating monomer $[SiO(CH_3)_2]$ units. PDMS is optically clear, and, is considered to be inert, non-toxic and non-flammable.

In principle, any compound containing two or more Si—H groups per molecule can act as a cross-linker of the present invention for the formation of a three dimensional silicone network, since this group readily reacts with vinyl groups catalyzed by transition metals such as the Karstedt catalysts. It is often desirable to use polymeric cross-linkers—for example in order to reduce volatility. Commercially available systems which are suitable are poly co-(methyl dimethyl) siloxanes of various configurations and molecular weights; some examples are HMS-031, HMS-064, HMS-301 from Gelest Inc. Also, homopolymers of polymethylhydrosiloxanes are applicable, such as HMS-991 from Gelest Inc. Equivalent cross-linkers with other side groups (such as ethyl, phenyl) also exist as hydrosilyl functional co- and homopolymers. Examples are HES-992, HDP-111, HPM-502 from Gelest Inc. It is also possible to use non-polymeric cross-linkers, such as certain well-defined molecules with 3 and 4 hydrosilyl groups, which act as cross linkers. Some examples of tetrafunctional SiH cross-linkers are tetrakisdimethylsiloxy silane, tetrakisdiphenylsiloxy silane and tetrakisdiethylsiloxy silane. Examples of three-functional cross-linkers are, e.g. metyltrisdimethylsiloxysilane and phenyltrisdimethylsiloxysilane.

A useful cross-linker with hydride functionality for use in the present invention is a hydrosilyl-containing short chained polymer such as a polysiloxane having in average 2 or more hydrosilyl groups per molecule. More preferably such hydrosilyl-containing polysiloxanes can be selected from the group of polymethylsiloxanes, polymethylphenyl siloxanes and poly co-(dimethyl diphenyl) siloxanes, containing in average 2 or more hydrosilyl groups per molecule. Even more preferred hydrosilyl-containing polysiloxanes can be selected from the group of polymethylsiloxanes, polymethylphenyl siloxanes and poly co-(dimethyl diphenyl) siloxanes containing in average between 3-15 hydrosilyl groups per molecule.

Such hydrosilyl-containing polysiloxanes should have a number average molecular weight from 300 to 100 000, preferably from 300 to 40 000, more preferred from 300 to 20 000 and most preferred from 320 to 10 000. The polydispersity (Mw/Mn) of the polymers should be in the range from 1 to 5, preferably from 1 to 3.

Another important factor for obtaining a qualitatively good lens polymer is the ratio of vinyl-containing polysiloxane and the hydrosilyl-containing cross-linker as this ratio is decisive for the cross-linking of the polymer and will thus influence the softness and elasticity of the lens.

In order to avoid reactive functional groups (such as vinyl or hydrosilyl) in the cured polymer, it is often preferred to use a stoichiometric amount of reactants when formulating polymers. In the present reaction there is, however, quite unexpected, an advantage to use a non-stoichiometric amount of reagents and preferably an excess of vinyl groups is used. Preferably the stoichiometric ratio between hydrosilyl and vinyl groups is from 0.3 to 0.9, more preferably from 0.3 to 0.7 in the pre-polymer mixture. Reaction rates are in general more or less proportional to the concentration of the species that undertake the reaction.

Having an excess of either one of the two functional groups thus increases the rate of cross-linking, which shortens the time to produce a lens. We have, surprisingly, not seen any adverse effects of the presence of excess vinyl groups, during extensive reliability tests of assembled adjustable lenses.

Traditionally, cross-linking of vinyl containing polysiloxanes with hydride containing cross-linkers, i.e., hydrosilylation, has been carried out using thermal catalysts. A well-known catalyst for hydrosilylation reactions with vinyl groups is the Karstedt catalyst $Pt_2\{[(CH_2=CH)Me_2Si]_2O\}_3$, which is also available with different variations of the ligands. Such variations have been desirable to influence and modify the reaction rate at different temperatures. A disadvantage when considering use of traditional Karstedt catalysts in the present context is that Karstedt catalysts are normally employed in the area 5-100 ppm Pt, typically an optimization between desired cross-linking rate and discoloration of the final polymer, as higher catalyst concentration could both give inherent absorption by itself and cause thermal degradation at elevated temperatures. Uncontrolled discoloration is of course a problem when one wants to control the formation of a deformable polymer with specific properties in a fast and reproducible process To prepare for a fast polymerization and assembly process a pre-polymer mixture is advantageously prepared before the single process manufacturing starts. A ready mixed pre-polymer mixture for making the cross-linked silicone polymer through hydrosilylation, of e.g. vinyl-terminated polysiloxanes, consists in principle of at least a vinyl-containing polysiloxane (preferably having 2 or more vinyl groups per molecule), a hydrosilyl-containing cross-linker such as, e.g., a hydrosilyl-containing polysiloxane (preferably having 2 or more H—Si groups per molecule) and a suitable transition metal catalyst for the hydrosilylation reaction to occur. In addition, the pre-polymer mixture may contain additives such as nonfunctional siloxanes (0-90%), stabilizing aids (UV stabilizers, thermal stabilizers, antimicrobial compounds), fillers (inorganic or organic particles), dyes/colorants etc.

In certain cases, it might also be advantageous to mix two or more vinylcontaining polysiloxanes, and/or two or more hydrosilyl-containing compounds. One example would be to use a 2-functional hydrosilyl compound as a chain extender, while using a 3- or more functional hydrosilyl as a cross-linker, which would enable a low viscosity of the pre-polymer mixture.

When the three required components (vinyl, hydrosilyl and catalyst) are mixed, a cross-linking reaction will start and it is a matter of time before the continuous polymer network is formed. Thus, the pre-polymer mixture is considered to be in a pseudo or quasi-stable state. In the practical application of soft polymers for tunable lenses, it is required that the pre-polymer mixture is prepared in such a way that the cross-linking is controlled. The pre-polymer mixture will ideally have a reasonable long pot-life, i.e. a fairly long time window for which the pre-polymer mixture can be used after mixing of the relevant components, while at the same time cure to an elastomeric solid within short time at elevated temperatures. In fact the present pre-polymer mixture will normally have a storage stability of more than 6 hours. When mixing the components of the pre-polymer mixture it is important that all components are well mixed.

The pre-polymer mixture must have a stable and low viscosity after mixing. In fact the pre-polymer mixture should have a viscosity of less than 5000 cst for easy and fast handling, which is achievable with low molecular weight starting materials. Such low viscosity is favourable for fast position/deposition and spreading of the droplet on the bottom plate.

Furthermore the pre-polymer mixture must have a high concentration of reactive groups for a fast reaction to take place when the polymerization is initiated. Reaction rate (r) is dependent on concentration of the reactants, for example proportional to the concentration of the hydrosilyl containing cross-linker ($C_{hydrosilyl}$) and the concentration of the vinyl-containing siloxane ($C_{vinyl}$) and the reaction constant k: $r = k \cdot C_{hydrosilyl} \cdot C_{vinyl}$.

Thus one aspect of the present invention relates to a pre-polymer mixture useful for preparing adjustable optical components such as adjustable optical lenses, wherein the pre-polymer mixture comprises a hydrosilyl-containing cross-linker having 2 or more hydrosilyl groups per molecule, a vinyl-containing polysiloxane having 2 or more vinyl groups per molecule, and a transition metal catalyst.

In one embodiment the present invention relates to a pre-polymer mixture comprising a hydrosilyl-containing polysiloxane having in average 2 or more hydrosilyl groups per molecule, a vinyl-containing polysiloxane having between 2 and 5 vinyl groups per molecule, and a platinum catalyst.

In another embodiment the pre-polymer mixture comprises a hydrosilylcontaining cross-linker selected from the group of polymethylsiloxanes, polymethylphenyl siloxanes and poly co(dimethyl diphenyl) siloxanes, containing in average 2 or more hydrosilyl groups per molecule, a vinyl-containing polysiloxane selected from the group of polydimethylsiloxane, poly(methyl phenyl) siloxanes, poly co-(dimethyl diphenyl) siloxanes, poly ter-(dimethyl diphenyl methyl phenyl) siloxanes, containing between 2-5 vinyl groups per molecule, and platinum catalyst.

In another embodiment the pre-polymer mixture comprises a hydrosilyl-containing cross-linker selected from the group of polymethylsiloxanes, polymethylphenyl siloxanes and poly co(dimethyl diphenyl) siloxanes, containing in average between 3 to 15 hydrosilyl groups per molecule, a vinyl-containing polysiloxane selected from the group of polydimethylsiloxane, poly(methyl phenyl) siloxanes, poly co-(dimethyl diphenyl) siloxanes, poly ter-(dimethyl diphenyl methylphenyl) siloxanes, containing between 2-5 vinyl groups per molecule, and platinum catalyst.

In another embodiment the vinyl-containing polysiloxanes chosen from the group of polydimethyl siloxanes, poly(methyl phenyl) siloxanes, poly co-(dimethyl diphenyl) siloxanes, poly ter-(dimethyl diphenyl methylphenyl) siloxanes, containing between 2-5 vinyl groups per molecule, are vinyl-terminated polysiloxanes.

In another embodiment the hydrosilyl-containing polysiloxane having 3 to 15 hydrosilyl groups per molecule is also a hydrosilyl-terminated polysiloxane.

In another embodiment of the present invention a non-stoichiometric amount of vinyl groups and hydrosilyl groups are used in the pre-polymer mixture, and preferably an excess of vinyl groups is used. Preferably the stoichiometric ratio between hydrosilyl and vinyl groups is from 0.3 to 0.9, more preferably from 0.3 to 0.7 in the pre-polymer mixture.

In yet another embodiment of the present invention the pot life of the prepolymer mixture is about 6 hours at ambient temperature.

Curing the pre-polymer may be obtained by placing the adjustable lens assembly in an oven at any temperature from for example 50° C. to 180° C. or higher during 1-20 hours (depending on the polymer formulation).

Only a droplet of the pre-polymer mixture is used for each lens and from one liter of the pre-polymer mixture about 500,000 to 1,000,000 lenses can be made.

Thus, to produce 1 million lenses only about 1-2 kg of pre-polymer mixture is needed.

Oils

The present invention relates to including a oil in the cross-linked polymers. The oils of the invention are miscible with the cross-linking polymer at all temperatures the device will be used, creating a homogeneous and thermodynamically stable mix. Relevant oils might be selected from the groups of aliphatic and aromatic esters of various organic and inorganic acids, such as phthalates, phosphates, maleates, fumarates, stearates; aromatic or aliphatic hydrocarbons; polymeric or oligomeric esters or polyesters; aromatic ethers; oligomeric or polymeric siloxanes with various ligands, such as methyl, phenyl, naphthyl, and even substituted aromatic ligands, with particularly heavy atomic substituents such as Bromine or Iodine; metalorganic oils containing heavy metal atoms, such as Ti, Zr, Zn, Ge, As.

Thus, in some embodiments the oil or combination of oils is selected from the group of oligomeric or polymeric siloxanes.

Nanoparticles

In some embodiments the deformable lens body further comprises inorganic or metalorganic nanoparticles, useful for increasing the refractive index of the deformable lens body, contained in the transparent oil or in the polymeric network, either as dispersed particles, or as hybrid materials where the metalorganic or inorganic phase is created in situ.

The nanoparticles may have average particle size in the range of less than 10 nm. The nanoparticles may be selected from the group of titanium oxides, zirconium oxides, tin oxides, zinc oxides etc.

The nanoparticles may constitute 0-50% by volume of the deformable lens body.

Catalyst

In some embodiments the polymer network of crosslinked or partly cross-linked polysiloxanes constituting the deformable lens body is prepared from a liquid pre-polymer mixture having a viscosity of less than 5000 cSt comprising a hydrosilylcontaining cross-linker selected from the group of polymethylsiloxanes, polymethylphenylsiloxanes and poly co(dimethyl diphenyl) siloxanes, containing in average between 3 to 15 hydrosilyl groups per molecule and having from 10 to 25 monomer units; a vinyl-containing polysiloxane selected from the group of polydimethylsiloxane, poly (methyl phenyl) siloxanes, poly co-(dimethyl diphenyl) siloxanes, poly ter-(dimethyl diphenyl methylphenyl) siloxanes, containing between 2-5 vinyl groups per molecule and having from 10 to 40 repeating monomer units, the stoichiometric ration of hydrosilyl groups to vinyl groups being from 0.3 to 0.9; and a transition metal catalyst.

In some other embodiments the transition metal catalyst is platinum (II) bis(acetylacetonate). In some further embodiments the transition metal catalyst is a Karstedt Catalyst, e.g. Pt 1,3 divinyl-1,1,3,3-tetramethyldisiloxane.

In some embodiments a cross linking rate moderator, such as an inhibitor or retardant is included in the formulation. Such moderators may be selected from a range of electron donating compounds, containing one or more groups such as vinyl, allyl, carbonyls etc.

The transparent optical device element may be used as lens in a camera module, such as a mobile phone camera, endoscopes, automotive cameras, laptops, industrial applications and numerous more.

Used as lens the invention has the advantage of being an imagine a simple autofocus technology, produced in automated or semi-automated mass production facilities, employing both wafer scale MEMS or semi-conductor facilities and advanced assembly and packaging technology, capable of producing very large volumes at extremely low prices.

The invention enables the production of large volumes of adjustable lenses for example for use in autofocus cameras that can change focus within very short time frames, even down to within 1 ms, and doing so with a low use of electrical power that prolongs the battery life time for such hand-held, mobile devices as cameras and laptop PCs.

In a fifth aspect of the invention a method for changing the refractive index of a deformable lens body is provided, the method comprising:
  adding an oil or combination of oils to a transparent polymer network.

Changing the refractive index of a deformable lens body may be read as changing the refractive index of the transparent optical device element.

The changing may be a reduction or an increase of the RI. For example by combining a polymer network having a RI lower than the oils or the combination of oils, or by combining a polymer network having a RI higher than the oils or the combination of oils a variation of the RI may be achieved.

The method according to the fifth aspect of the invention may further comprise:
  curing the transparent polymer network and the oil or combination of oils, thereby providing a transparent polymer network of crossed linked or partly crossed linked polymers including the oil or combination of oils.

In some embodiments the method according to the fifth aspect of the invention employs the oil or combination of oils according to the first aspect of the invention.

In a further aspect the present invention relates to an adjustable optical lens of sandwich structure prepared according to the present invention comprising a soft and deformable lens body (3) confined in a cavity bounded by a first side comprising actuators (1) on a thin glass surface (2) supported by sidewalls (4), wherein second surface constituting a bottom side of the cavity is arranged as an attached transparent plate (5) onto the lens body such that there is an opening between the side walls and the edges of the transparent plate, wherein the deformable lens body (3) have an shear modulus of less than 100 kPa.

The first, second and third and other aspects or embodiments of the present invention may each be combined with any of the other aspects and embodiments. These and other aspects of the invention will be apparent from and elucidated with reference to the embodiments described hereinafter.

BRIEF DESCRIPTION OF THE DRAWINGS

The transparent optical device according to the invention will now be described in more detail with regard to the accompanying figures. The figures show one way of implementing the present invention and is not to be construed as being limiting to other possible embodiments falling within the scope of the attached claim set.

DETAILED DESCRIPTION OF THE INVENTION

Figure 1:
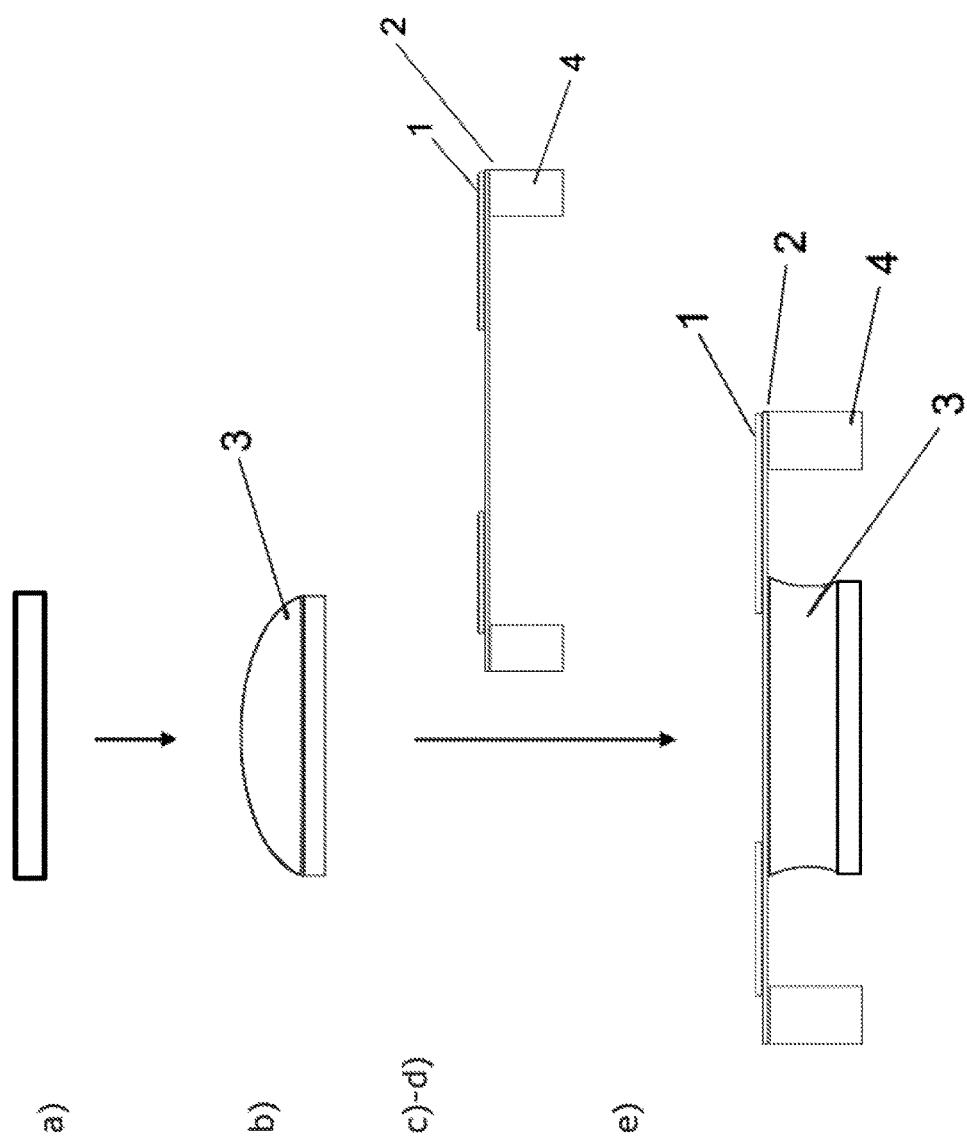
FIG. 1 shows the transparent optical device element and the different steps of production of the transparent optical device element according to one aspect of the invention.

FIG. 1 shows the transparent optical device element and the different steps (ae) of production of the transparent optical device element according to one aspect of the invention.

The transparent optical device element illustrated in FIG. 1 comprises a deformable lens body 3, actuators 1 arranged on a thin, flexible glass surface 2 supported by continuous or semi-continuous rigid sidewalls 4.

Example 1

Polydimethylsiloxane Networks

Figure 2:
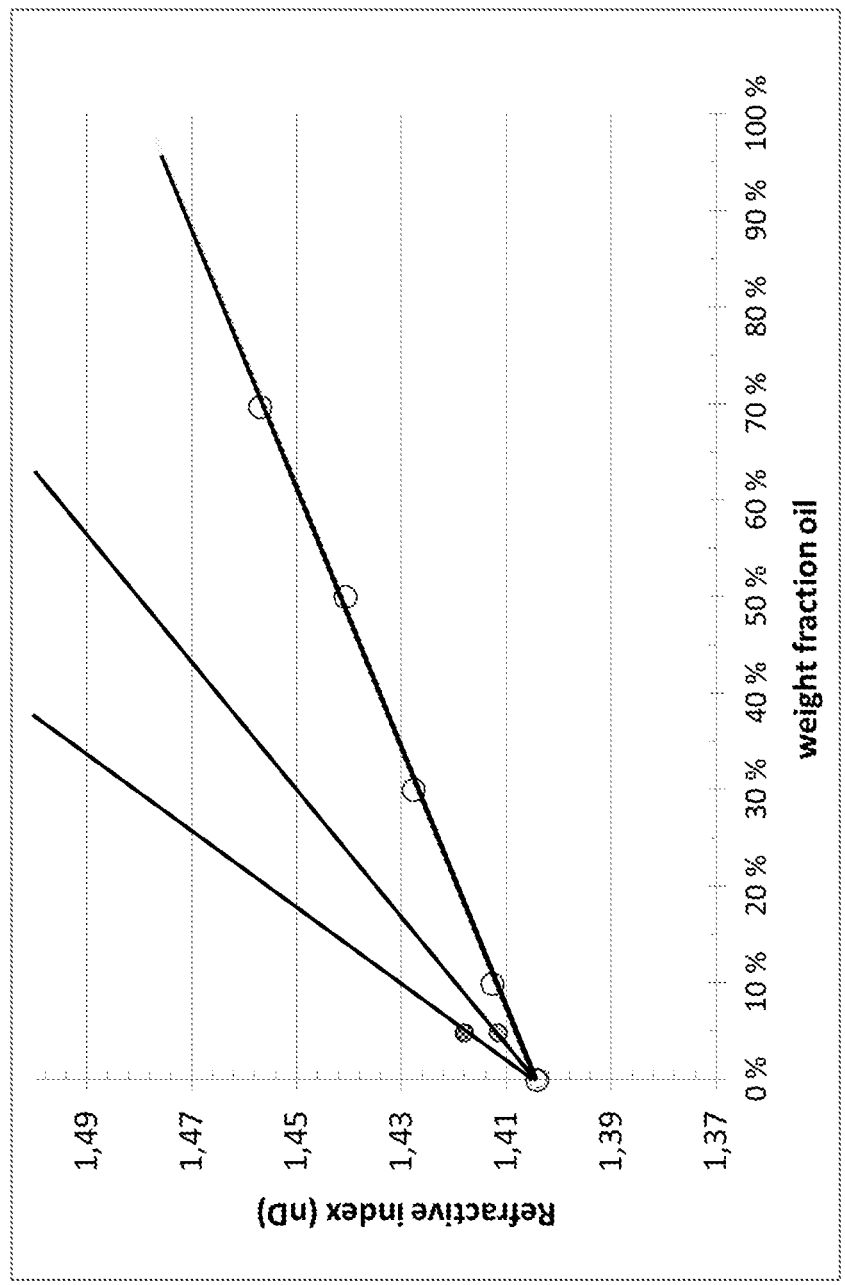
FIG. 2 shows the increase of the refractive index of a crosslinked polydimethylsiloxane by incorporating oils with higher refractive index.

FIG. 2 shows the increase of the refractive index of a crosslinked polydimethylsiloxane by incorporating oils with higher refractive index.

The three dimensional network consists of vinyl terminated polydimethylsiloxane (POMS), crosslinked with tetrakis(dimethylsiloxy)silane giving a refractive index of 1.404. The oils are (grey), 1,1,5,5-Tetraphenyl, 1,3,3,5-Tetramethyl-Trisiloxane with refractive index 1.55, (checkered) 2-bromonaphthalene with refractive index 1.66, (open circles) a low molecular weight poly(phenylmethyl)siloxane with refractive index 1.48 (PMM-0011 from Gelest, molecular weight of 350-450, according to the producer). Only about 5% of the two higher molecular weight oils were compatible with the three dimensional POMS network, but nevertheless increased the index according to a linear addition rule. Above this level, the resulting polymer either did not cure to a solid (bromonaphthalene), or yielded an opaque solid, due to phase separation of the oil and the polymer network. However, the 1.48 index poly(phenylmethyl)siloxane (PMM-0011) was miscible with POMS throughout the whole range from 0-100%. At >80% oil, the polymer became too loosely cross-linked, giving a semi-solid or even liquid matter.

To demonstrate the importance of molecular weight on the miscibility of the non-functional oligomers/polymers with the silicone network, another poly(phenylmethyl)siloxane with higher molecular weight than the 1.48 index one was incorporated (PMM-0021 from Gelest Inc.). This polymer has a refractive index of 1.52, and a molecular weight according to the producer of 700-900. With only as little as 1% of the oil in the POMS network, the resulting polymer was opaque, and useless in optical applications.

Adding only 5% of 1,1,3,5,5-Pentaphenyl, 1,3,5-Trimethyl-Trisiloxane with refractive index 1.58 to the polydimethylsiloxane network yielded an opaque solid polymer. By mixing two oils, this one and the 1.48 index poly(phenylmethyl)siloxane (PMM-0011) to a ratio 1:9, it was possible to implement more than 50% into a polydimethylsiloxane network. The refractive index of the polymer was 1.448, with 50% of only PMM-0011, a refractive index of 1.440 was achieved. This shows that, by carefully choosing optimal oils or blends of oils, it is possible to tweak and obtain miscible polymers with higher index of refraction than the pure polymer network would give.

Example 2

Poly-Co(diphenyl Dimethyl) Siloxane Networks

Figure 3:
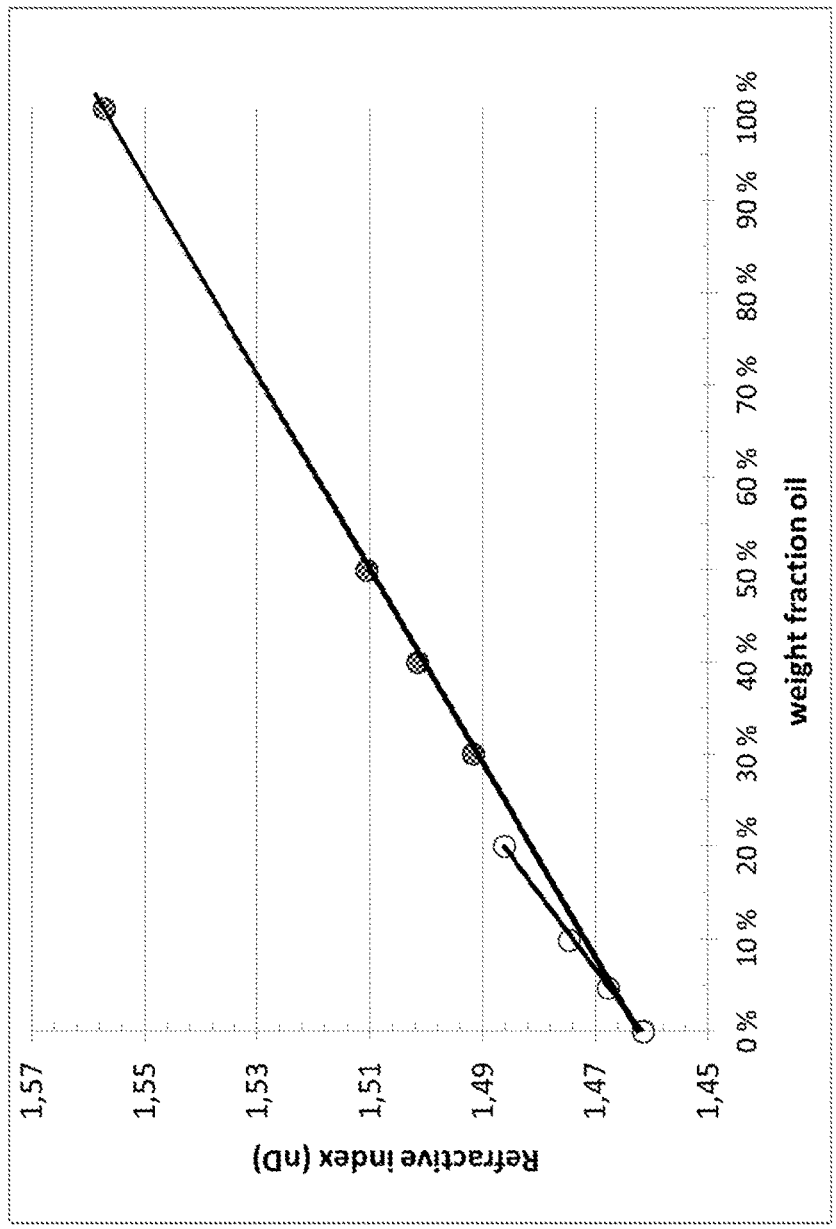
FIG. 3 shows the increase of the refractive index of a crosslinked poly co-(diphenyl dimethyl)siloxane by incorporating oils with higher refractive index.

FIG. 3 shows the increase of the refractive index of a crosslinked poly co(diphenyl dimethyl)siloxane by incorporating oils with higher refractive index.

The three dimensional network consists of vinyl terminated poly co-(dimethyl, diphenyl)siloxane (approx. 16 mole % diphenyl), crosslinked with tetrakis(dimethylsiloxy) silane giving a refractive index of 1.46. The oils are (open circles), 1,1,3,5,5-Pentaphenyl, 1,3,5-Trimethyl-Trisiloxane with refractive index 1.58, (checkered) 1,1,5,5-Tetraphenyl, 1,3,3,5-Tetramethyl-Trisiloxane with refractive index 1.55. About 20% of the higher molecular weight oil was compatible with the three dimensional PDMS network. Above this level, the resulting polymer yielded an opaque solid, due to phase separation of the oil and the polymer network. However, the 1.55 index oil was miscible with the network silicone throughout the whole range from 0-100%. At >80% oil, the polymer became too loosely cross-linked, giving a semi-solid or even liquid matter.

Example 3

Poly-Co(diphenyl Dimethyl) Siloxane Networks (II)

Figure 4:
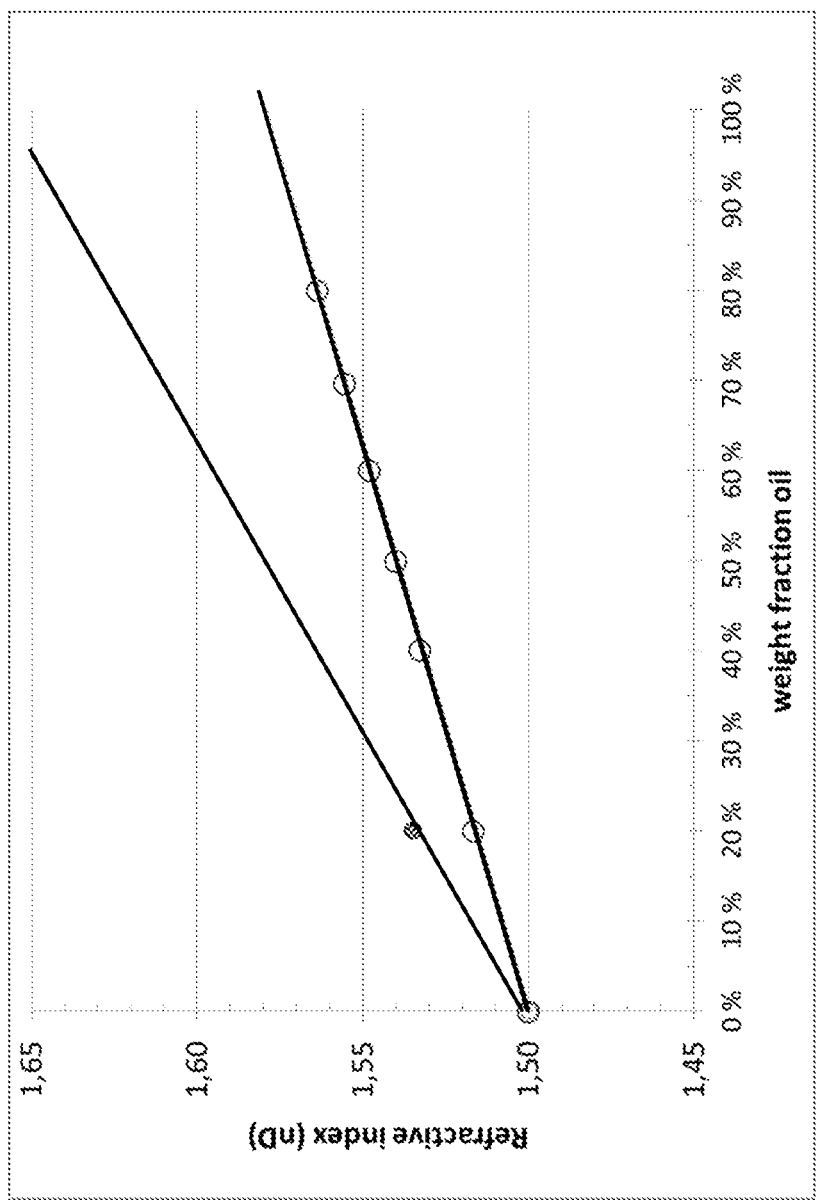
FIG. 4 shows the increase of the refractive index of a crosslinked poly co(diphenyl dimethyl)siloxane by incorporating oils with higher refractive index.

FIG. 4 shows the increase of the refractive index of a crosslinked poly co(diphenyl dimethyl)siloxane by incorporating oils with higher refractive index. The three dimensional network consists of vinyl terminated poly co-(dimethyl, diphenyl)siloxane (approx. 20 mole % diphenyl), crosslinked with tetrakis(dimethylsiloxy)silane giving a refractive index of 1.50. The oils are (open circles), 1,1,3, 5,5-Pentaphenyl, 1,3,5-Trimethyl-Trisiloxane with refractive index 1.58, (checkered) bromonaphthalene with refractive index 1.66. The 1.58 index oil was miscible with the network silicone throughout the whole range from 0-100%. At >80% oil, the polymer became too loosely cross-linked, giving a semisolid or even liquid matter. The increase in refractive index follows a simple addition rule. The network polymer was compatible with the addition of 20% bromonaphthalene, above this level the polymer did not cure completely, but remained transparent. The refractive index was increased by a level in line with the linear addition rule.

Example 4

Blending High Refractive Index Oils Into Commercially Available Silicones

Figure 5:
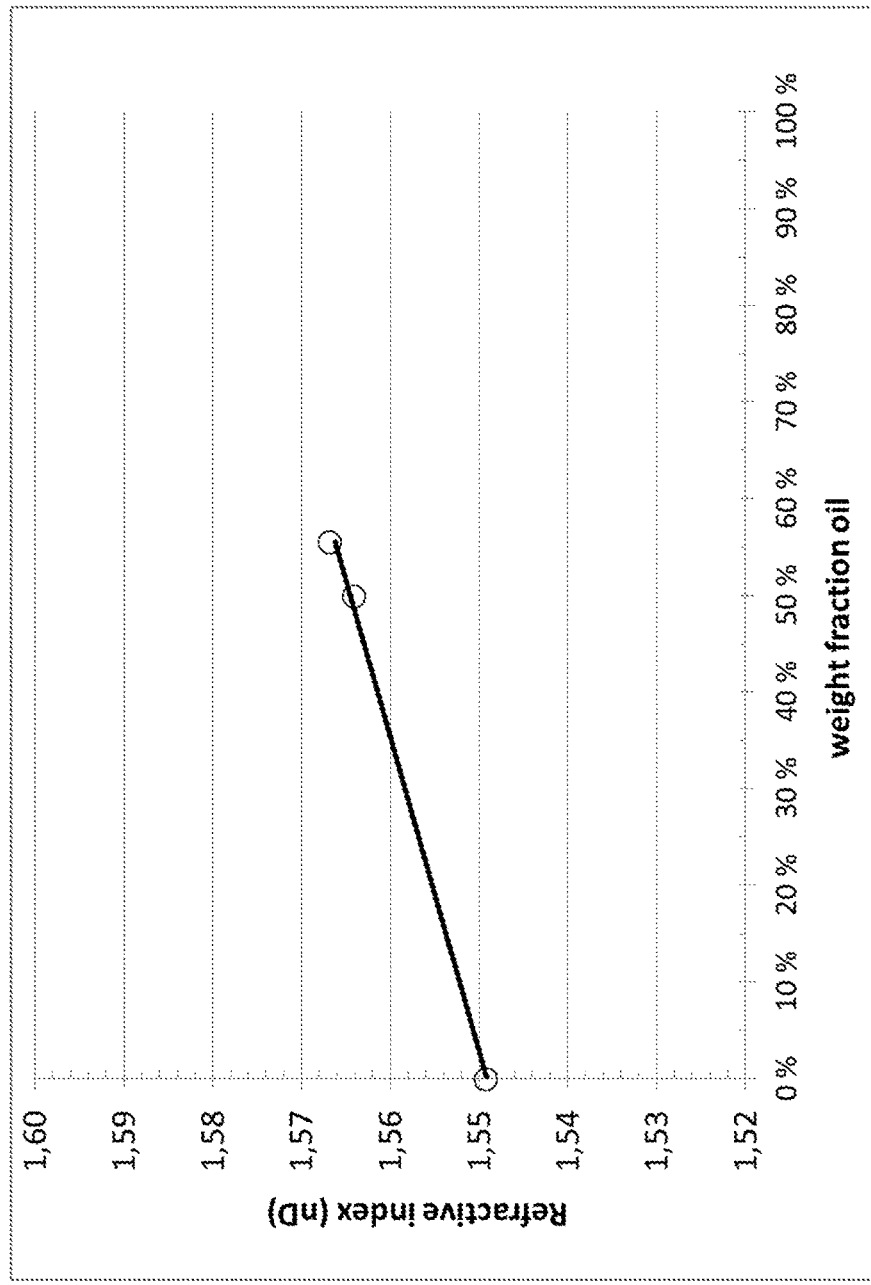
FIG. 5 shows the increase the refractive index of a commercial optical silicone by incorporating high index oils.

FIG. 5 shows the increase the refractive index of a commercial optical silicone by incorporating high index oils.

A commercially available silicone—LS-6257 from Nusil was mixed according to the recommendations, and added various amounts of 1,1,3,5,5-Pentaphenyl, 1,3,5-Trimethyl-Trisiloxane with refractive index 1.58. At concentrations up to 55% oil, the resulting polymer was transparent, soft and stable after curing. With 60% oil, the cured polymer turned slightly opaque, rendering it not suitable for use in optical applications. The refractive index increased from 1.55 to 1.567 with a level of 55% oil of index 1.58. This was in line with the linear addition rule.

Figure 6:
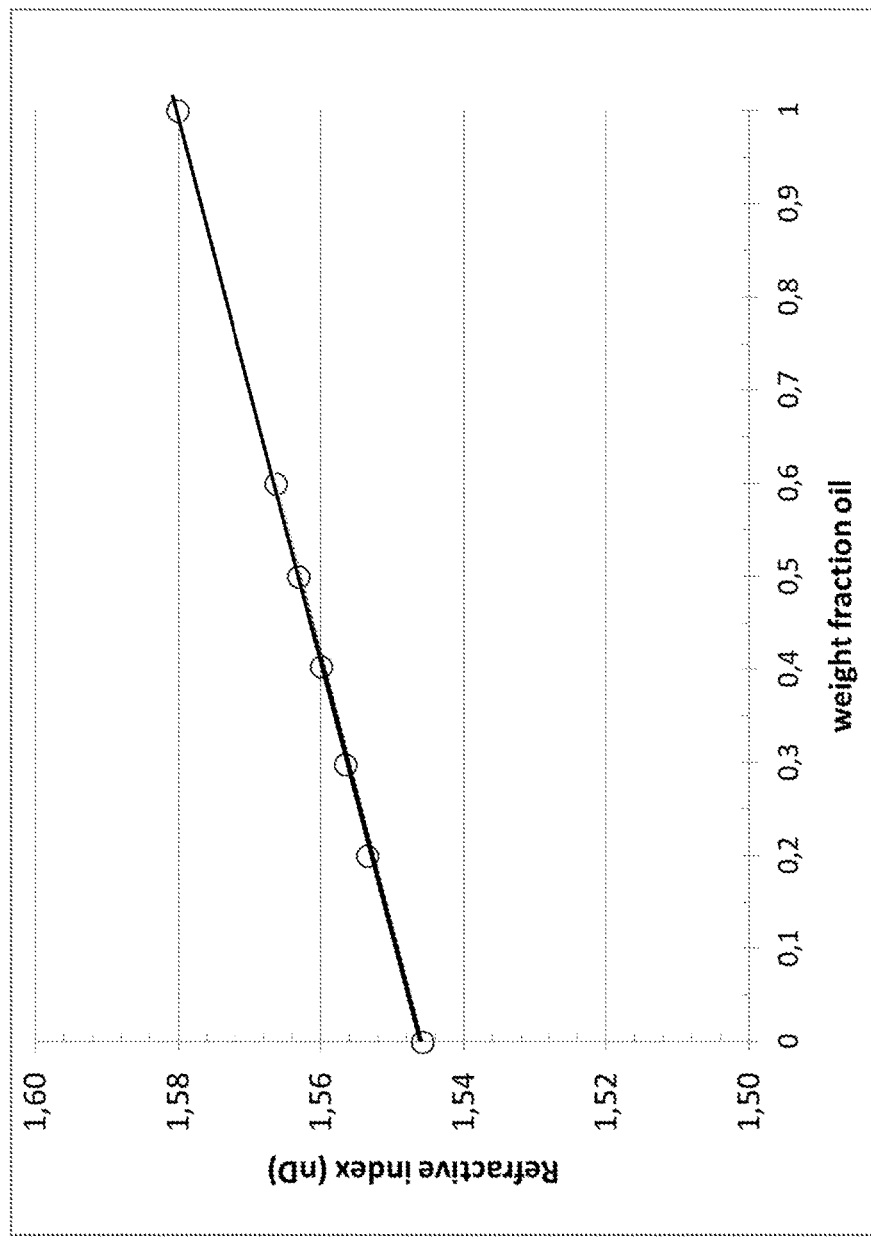
FIG. 6 shows another commercially available silicone—OE-6450 from Dow Corning, with refractive index of 1,546 was mixed according to instructions and added various amounts of 1,1,3,5,5-Pentaphenyl, 1,3,5-Trimethyl-Trisiloxane, with refractive index of 1,58.

FIG. 6 shows another commercially available silicone—OE-6450 from Dow Corning, with refractive index of 1,546 was mixed according to instructions and added various amounts of 1,1,3,5,5-Pentaphenyl, 1,3,5-Trimethyl-Trisiloxane, with refractive index of 1.58. At concentrations up to 50%, the resulting polymer was gradually softer and softer, while stable and transparent after curing. With 60% oil, the polymer did not cure, and remained a liquid. The refractive index increased from 1.546 to 1.563 with 50% oil, in line with the linear addition rule. By adding to the mixture of the OE-6450 1% of tetrakis(dimethylsiloxy)silane, solid, stable and transparent polymers could be prepared with as much as 80% oil, resulting in a refractive index of 1.573.

Example 5

Dynamic Viscoelastic Behavior of Elastomers with Different Modulus

Figure 7:
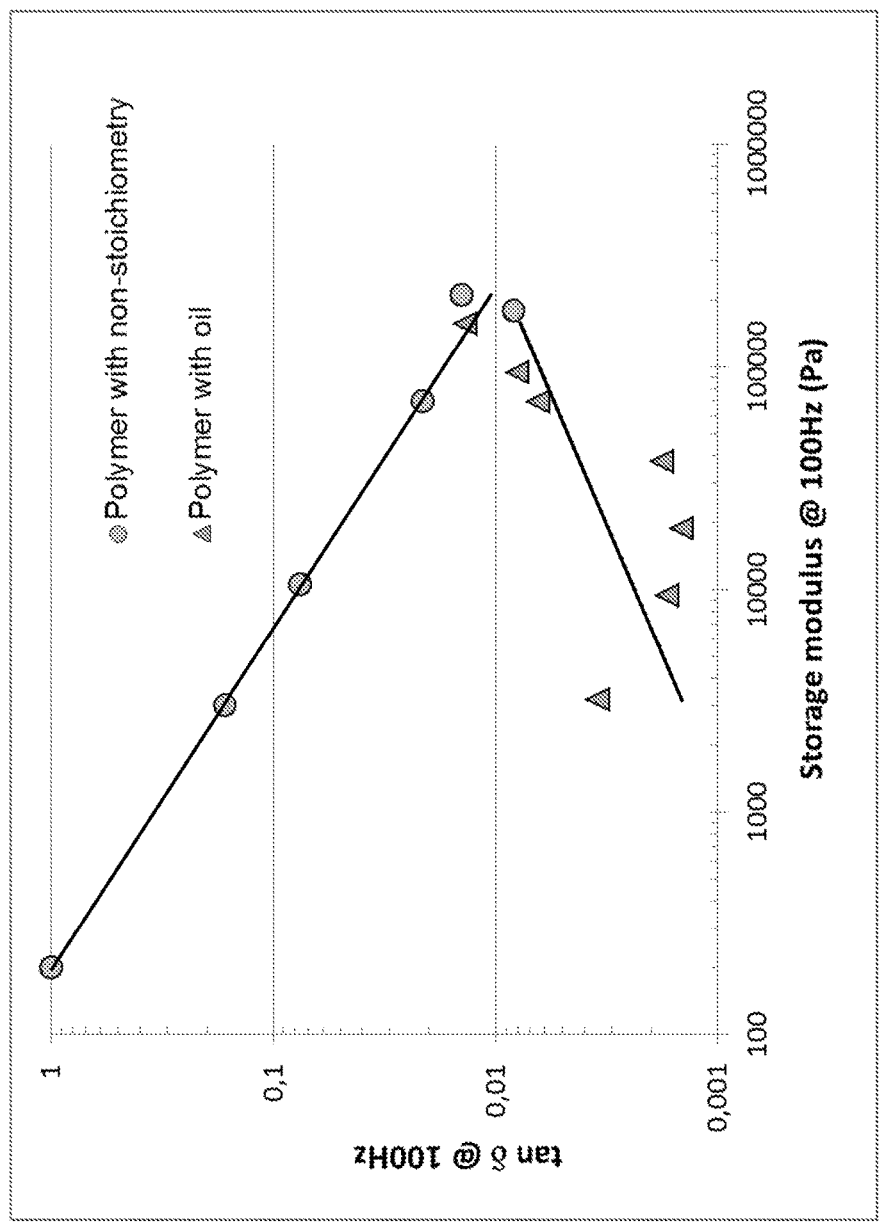
FIG. 7 shows the loss tangent (tan δ) as a function of the shear modulus, measured using a dynamic rheometer.

FIG. 7 shows the loss tangent (tan δ) as a function of the shear modulus, measured using a dynamic rheometer. All polymers were prepared by mixing vinyl terminated polydimethylsiloxane with a poly co(-dimethyl methyl) siloxane (DMS-V22 and HMS-151 from Gelest) and a small amount of a Pt catalyst. The polymers with "non-stoichiometric" ratio between vinyl and hydride were all prepared with surplus vinyl groups, with from 3-10 percent by weight of HMS-151. The resulting shear modulus varied from 0.2 to 210 kPa. The polymers with added oil were prepared with a 1:9 ratio of HMS-151 to DMS-V22, and adding from 0 to 89% by weight of a linear polydimethylsiloxane oil. The resulting shear modulus varied from 3 to 200 kPa. By plotting the loss tangent (tan δ) vs the shear modulus, it is clearly seen that especially when the modulus is reduced to below 100 kPa, the loss tangent of the polymers with oil becomes significantly lower than when the modulus is reduced by simply introducing dangling polymer ends in the elastomeric network. A high loss tangent will directly translate into a slower actuation of a lens containing the polymer.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

I claim:

1. A method of manufacturing at least one deformable lens body having a changeable refractive index, said method comprising:
adding an oil or combination of oils to a transparent polymer network during the manufacturing of the at least one deformable lens body, thereby changing the refractive index of the at least one deformable lens body, wherein said at least one deformable lens body has a shear modulus of less than 100 KPa.

2. The method according to claim 1, further comprising:
curing said transparent polymer network and oil or combination of oils, thereby providing a transparent polymer network of crossed linked or partly crossed linked polymers including said oil or combination of oils.

3. The method according to claim 2, wherein said transparent polymer network of cross-linked or partly cross-linked polymers is a polymer network of cross-linked or partly cross-linked polysiloxanes.

4. The method according to claim 2, wherein the refractive index ratio between said transparent polymer network of cross-linked or partly cross-linked polymers and said oil or combination of oils is between 0.8 and 1.

5. The method according to claim 2, wherein the difference in refractive index ratio between said transparent polymer network of cross-linked or partly cross-linked polymers and said oil or combination of oils is between 0.01 and 0.30.

6. The method according to claim 2, wherein said oil or combination of oils has a refractive index, which is at least 0.02 units higher than the refractive index of said transparent polymer network of cross-linked or partly cross-linked polymers.

7. The method according to claim 2, wherein said transparent polymer network of cross-linked or partly cross-linked polymers and said oil or combination of oils are in the same liquid phase.

8. The method according to claim 2, wherein said oil or combination of oils is contained in said transparent polymer network of cross-linked or partly cross-linked polymers.

9. The method according to claim 2, wherein the amount of said oil or combination of oils is in a range between 0.1 to 90% vol/vol of said transparent polymer network of cross-linked or partly cross-linked polymers.

10. The method according to claim 1, wherein said oil or combination of oils have a molecular weight lower than 1000 g/mol.

11. The method according to claim 1, wherein said oil or combination of oils have a boiling point above 200° C. at atmospheric pressure at sea level.

12. The method according to claim 1, wherein said oil or combination of oils is selected from the group consisting of oligomeric siloxanes and polymeric siloxanes.

* * * * *